United States Patent

Nakamura et al.

Patent Number: 5,429,872
Date of Patent: Jul. 4, 1995

[54] PAPER FEED ROLLER

[75] Inventors: Tsutomu Nakamura; Masaharu Takahashi, both of Annaka, Japan

[73] Assignee: Shin-Etsu Chemical Co., Ltd., Tokyo, Japan

[21] Appl. No.: 269,277

[22] Filed: Jun. 30, 1994

Related U.S. Application Data

[63] Continuation-in-part of Ser. No. 77,151, Jun. 16, 1993, abandoned.

[30] Foreign Application Priority Data

Jun. 16, 1992 [JP] Japan .................................. 4-181879

[51] Int. Cl.$^6$ .............................................. B32B 15/08
[52] U.S. Cl. ...................................... 428/391; 528/32; 528/43; 528/15; 528/31; 528/24; 525/478; 525/477; 428/447; 428/450
[58] Field of Search .................. 428/391, 447, 450; 528/32, 43, 15, 31; 525/478, 477

[56] References Cited

U.S. PATENT DOCUMENTS

| | | | |
|---|---|---|---|
| 4,157,426 | 7/1979 | Hatanaka et al. | 521/122 |
| 5,026,602 | 6/1991 | Kitagawa et al. | 428/336 |
| 5,223,596 | 6/1993 | Okawa et al. | 528/15 |

*Primary Examiner*—Melvyn I. Marquis
*Assistant Examiner*—Margaret W. Glass
*Attorney, Agent, or Firm*—Millen, White, Zelano, & Branigan

[57] ABSTRACT

A paper feed roller formed from a high friction rubber obtained by curing a high friction rubber-forming composition comprising in admixture, (A) a silicone rubber compound containing an organopolysiloxane of the average compositional formula (1):

$$R_n^1 SiO_{(4-n)/2} \quad (1)$$

wherein $R^1$ is a substituted or unsubstituted monovalent hydrocarbon group, the groups represented by $R^1$ containing up to 95 mol. % of a methyl group, at least 3 mol. % of a phenyl group and at least 0.2 mol. % of a vinyl group, and n is a positive number of from 1.95 to 2.05, and (B) a silicone rubber compound containing an organopolysiloxane of the average compositional formula (2):

$$R_m^2 SiO_{(4-m)/2} \quad (2)$$

wherein $R^2$ is a substituted or unsubstituted monovalent hydrocarbon group, the groups represented by $R^2$ containing at least 98 mol. % of a methyl group, and m is a positive number of from 1.95 to 2.05, said silicone rubber compounds (A) and (B) being mixed in a weight ratio between 5:95 and 95:5.

9 Claims, No Drawings

PAPER FEED ROLLER

This application is a continuation-in-part of application Ser. No. 08/077,151 filed on Jun. 16, 1993, now abandoned.

BACKGROUND OF THE INVENTION

1. Field of the Invention

This invention relates to paper feed rollers which have a high coefficient of friction and are stable against environmental changes and are effective for plain paper copiers and facsimile machines.

2. Prior Art

Image forming apparatus as typified by electrophotographic copying machines and laser printers include a paper feed section for picking up discrete sheets of paper from a paper container via a najar roller and a paper separating mechanism and then delivering each sheet of paper toward an image transfer section via a conveyor roller arrangement along a paper feed path. In general image forming apparatus, the najar roller for picking up sheets of paper is disposed relative to the paper container such as a paper cassette or tray. The paper separating mechanism cooperates with the najar roller to separate the sheets of paper for allowing only a single sheet of paper to advance to the paper feed path.

Several systems are known for the paper separating mechanism. A paper separating mechanism of the friction retard system includes a paper feed roller and a retard member which may be either a fixedly secured pad or a retard roller.

The paper separating mechanism of the type equipped with a retard roller uses a means for holding the roller in a fixed state and causing the roller to rotate at predetermined timing, for preventing local wear of the retard roller surface.

Also known is a paper separating mechanism of the feed and reverse roller (FRR) system which uses a feed roller and a reverse roller adapted to rotate to the reverse of the paper feed direction. When sheets of paper enter between the feed and reverse rollers, only a sheet of paper on the feed roller side is delivered and a sheet or sheets of paper on the reverse roller side are fed back to the paper container. Paper separating mechanisms of the FRR system are disclosed in for example, Japanese Patent Application Kokai (JP-A) Nos. 57841/1984 and 192036/1991. In the mechanisms of these patent applications, a drive shaft for driving the reverse roller in a direction opposite to the paper feed direction is supported via a friction member which is biased by a coil spring for controlling the force of the friction member applied to the reverse roller upon reverse rotation.

In the conventional paper separating mechanisms mentioned above, both the feed roller and the retard roller are made of rubber or similar material in order that these rollers may have appropriate coefficients of friction relative to paper. Especially, the retard roller is made of natural rubber or polynorbornene to ensure that it pushes back a sheet of paper.

The rollers of these materials, however, suffer from wear and degradation due to low wear resistance and poor stability like the materials used in conventional najar rollers. Especially the retard roller is rubbed by a sheet of paper to be fed forward at the instant when an entrained sheet of paper is fed back to the tray. The retard roller thus undergoes substantial wear and degradation.

In addition, the roller members are sensitive to environmental changes and aging and substantially lose their coefficient of friction at low temperatures, failing to ensure normal paper feed operation.

EPDM and similar materials are sometimes used, but they also tend to lose their coefficient of friction at low temperatures. Then the paper separating mechanism fails to provide paper separating ability, allowing plural paper feed.

SUMMARY OF THE INVENTION

Therefore, an object of the present invention is to provide a paper feed roller having a high coefficient of friction, wear resistance and properties stable to environmental changes. Another object of the present invention is to provide a paper feed roller effective for plain paper copiers, facsimile machines, etc.

We have found that by using a high friction rubber obtained by curing a composition comprising in admixture, (A) a silicone rubber compound containing an organopolysiloxane of the average compositional formula (1) defined below and (B) a silicone rubber compound containing an organopolysiloxane of the average compositional formula (2) defined below, there is obtained a paper feed roller having a high coefficient of friction, wear resistance and properties stable to changes in the environment.

$$R_n^1 SiO_{(4-n)/2} \tag{1}$$

$$R_m^2 SiO_{(4-m)/2} \tag{2}$$

In formula (1), $R^1$ is a substituted or unsubstituted monovalent hydrocarbon group, the groups represented by $R^1$ containing up to 95 mol. % of a methyl group, at least 3 mol. % of a phenyl group and at least 0.2 mol. % of a vinyl group, and n is a positive number of from 1.95 to 2.05. In formula (2), $R^2$ is a substituted or unsubstituted monovalent hydrocarbon group, the groups represented by $R^2$ containing at least 98 mol. % of a methyl group, and m is a positive number of from 1.95 to 2.05.

More particularly, (A) a silicone rubber compound containing an organopolysiloxane of average compositional formula (1) wherein the groups represented by $R^1$ contain up to 95 mol. % of methyl, at least 3 mol. % of phenyl and at least 0.2 mol. % of vinyl and (B) a silicone rubber compound containing an organopolysiloxane of average compositional formula (2) wherein the groups represented by $R^2$ contain at least 98 mol. % of methyl are incompatible at a molecular level and form an island-in-sea structure where two phases of 0.1 to 100 μm are macroscopically dispersed because the organopolysiloxanes of average compositional formulae (1) and (2) have different methyl contents. Due to this interaction, the paper feed roller formed by the silicone rubber which is obtained by curing the composition comprising the admixture of the silicone rubber compound (A) and the silicone rubber compound (B) exhibits high elasticity or repulsion, high friction, and low wear. The paper feed rollers are wear resistant and stable as compared with conventional olefin material based rolls.

Therefore, the present invention provides a paper feed roller formed from a high friction rubber obtained by curing a high friction rubber-forming composition comprising in admixture, (A) a silicone rubber compound containing an organopolysiloxane of the average composition formula (1):

$$R_n^1 SiO_{(4-n)/2} \qquad (1)$$

wherein $R^1$ is a substituted or unsubstituted monovalent hydrocarbon group, the groups represented by $R^1$ containing 95 mol. % of or less of a methyl group, at least 3 mol. % of a phenyl group and at least 0.2 mol. % of a vinyl group, and n is a positive number of from 1.95 to 2.05, and (B) a silicone rubber compound containing an organopolysiloxane of the average compositional formula (2):

$$R_m^2 SiO_{(4-m)/2} \qquad (2)$$

wherein $R^2$ is a substituted or unsubstituted monovalent hydrocarbon group, the groups represented by $R^2$ containing at least 98 mol. % of a methyl group, and m is a positive number of from 1.95 to 2.05, wherein the silicone rubber compounds (A) and (B) are mixed in a weight ratio of 5:95 to 95:5, such that the components form two macroscopically dispersed phases.

DETAILED DESCRIPTION OF THE INVENTION

The paper feed roller according to the present invention is formed from a high friction rubber obtained by a high friction rubber-forming composition which is defined as comprising in admixture, silicone rubber compounds (A) and (B). Silicone rubber compound (A) contains an organopolysiloxane of average compositional formula (1).

$$R_n^1 SiO_{(4-n)/2} \qquad (1)$$

In formula (1), $R^1$ is a substituted or unsubstituted monovalent hydrocarbon group, preferably having 1 to 12 carbon atoms, especially 1 to 8 carbon atoms. Examples of the monovalent hydrocarbon group include alkyl groups such as methyl, ethyl and propyl; cycloalkyl groups such as cyclopentyl and cyclohexyl; alkenyl groups such as vinyl and allyl; cycloalkenyl groups; aryl groups such as phenyl and tolyl; and substituted ones of these groups wherein some or all of the hydrogen atoms are replaced by halogen atoms such as fluorine atoms and chlorine atoms, and cyano groups, for example, chloromethyl, γ-trifluoropropyl, perfluoroalkyl and cyanoethyl groups.

The groups represented by $R^1$ contain up to 95 mol. %, preferably 5 to 95 mol. %, more preferably 5 to 90 mol. %, most preferably 70 to 90 mol. % of a methyl group, at least 3 mol. %, preferably 3 to 20 mol. %, more preferably 5 to 20 mol. % of a phenyl group and at least 0.2 mol. %, preferably 0.2 to 1 mol. %, more preferably 0.3 to 1 mol. % of a vinyl group. Phenyl contents of less than 3 mol. % fail to provide a high coefficient of friction. Vinyl contents of less than 0.2 mol. % fail to provide adequate wear resistance though they only slightly alter frictional properties. Letter n is a positive number of from 1.95 to 2.05.

The organopolysiloxane of formula (1) preferably has a polymerization degree of 1,000 to 10,000 and a viscosity of about 100,000 to 10,000,000, centistokes at 25° C. though its viscosity is not limited thereto.

To silicone rubber compound (A), there may be added any of well-known fillers such as wet silica, dry silica and, ground quartz, and additives such as low viscosity hydroxy-terminated silicone oil, carbon-functional silanes, and silicone oil if desired. The filler may preferably be blended in an amount of 10 to 50 parts by weight per 100 parts by weight of the organopolysiloxane of formula (1). Additive-free systems consisting of polymers are also acceptable.

Silicone rubber compound (A) is obtained from the organopolysiloxane of formula (1) or optionally by mixing it with fillers and additives as mentioned above. Any desired mixing method capable of uniform mixing is employed. Preferably components are milled by a conventional rubber blending mill such as a Banbury mixer, pressure kneader, two-roll mill and three-roll mill.

Silicone rubber compound (B) contains an organopolysiloxane of average compositional formula (2).

$$R_m^2 SiO_{(4-m)/2} \qquad (2)$$

In formula (2), $R^2$ is a substituted or unsubstituted monovalent hydrocarbon group which is as defined for $R^1$. The groups represented by $R^2$ contain at least 98 mol. % of a methyl group. In addition to methyl, the $R^2$ groups preferably contain 0.001 to 2 mol. % of a vinyl group. Letter m is a positive number of from 1.95 to 2.05.

Silicone rubber compound (B) may consist of an organopolysiloxane(s) of formula (2) or, like compound (A), may have blended therein any of well-known fillers and additives commonly used in conventional silicone rubber compositions, for example, such as wet silica, dry silica and, ground quartz, low viscosity hydroxy-terminated silicone oil, carbon-functional silanes, and silicone oil. The filler may preferably be blended in an amount of 10 to 50 parts by weight per 100 parts by weight of the organopolysiloxane of formula (2). Silicone rubber compound (B) may be prepared by the same method as compound (A).

Silicone rubber compound (B) is commercially available, for example, under the trade names of KE931u, KE951u, KE520 and KE555u from Shin-Etsu Chemical Co., Ltd.

The composition of the present invention is obtained by mixing silicone rubber compounds (A) and (B), preferably in a weight ratio between 5:95 and 95:5, especially between 20:80 and 80:20 because high elasticity or repulsion and high friction are expected with this mixing ratio.

Silicone rubber compounds (A) and (B) may be mixed by any desired mixing method as long as a uniform mixture is obtained, for example, using a conventional rubber blending mill such as a Banbury mixer, pressure kneader, two-roll mill and three-roll mill. For effective milling, suitable additives such as ground quartz, wet or dry silica, process oil commonly used in synthetic rubber, carbon functional silanes and modified silicone oil may be added if desired.

The composition of the invention may be vulcanized and cured in a conventional manner. Independent of the curing mechanism, there can be used any curing agents which induce vulcanization or curing of silicone rubber by utilizing radical reaction or addition reaction. A choice may be made of conventional well-known radical curing agents including organic peroxides, for example, alkyl peroxides such as di-t-butyl peroxide and 2,5-dimethyl-2,5-di(t-butylperoxy)hexane and aryl peroxides such as dicumyl peroxide; and addition reaction curing agents, for example, an organohydrogenpolysiloxane having at least two hydrogen atoms attached to silicon atoms in a molecule and a catalytic amount of a platinum series catalyst. The amount of the curing agent used is the same as commonly used for conventional silicone rubber. For example, the organic peroxide may be used in an amount of 0.1 to 5 parts by weight per 100 parts by weight of the total of the organopolysiloxanes of formulae (1) and (2). The organohydrogenpolysiloxane may be used so that the molar ratio of SiH in the organo-hydrogenpolysiloxane and vinyl group in the organopolysiloxanes of formulae (1) and (2) is 0.5 to 5.

The composition of the invention may be molded by conventional methods, for example, pressure molding, extrusion molding, injection molding and calendering, followed by curing as mentioned above into a silicone rubber by which a paper feed roller is formed.

The paper feed roller of the present invention is comprised of a cylindrical body made of metal such as aluminum, steel and, stainless steel, or plastics, and the silicone rubber described above covering the surface of the body in a thickness of 1 to 30 mm, preferably 2 to 20 mm, more preferably 3 to 10 mm and in a length of 2 to 100 mm, preferably 5 to 50 $\mu$m.

The paper feed roller is used for multi-purpose paper feeding machines such as dry copying machines, facsimile machines, traffic ticket feeders, bank bill feeders and the like.

Since the paper feed roller according to the present invention has the particular silicone rubber described above at the surface, it has a high coefficient of friction and thus has a high paper feeding ability. The paper feed roller of the present invention has also high wear resistance, whereby the roller is prevented from abrading by papers for a long period of time and the coefficient of friction of the roller is hardly lowered by paper powders. The paper feed roller of the present invention is superior in weather resistance and ozone resistance as compared with the conventional synthetic rubber roller. It has a high durability.

EXAMPLE

Examples of the present invention are given below by way of illustration and not by way of limitation.

Examples 1-5 and Comparative Examples 1-3

There were furnished Polymer A (methyl-phenyl-vinylsiloxane), phenyl-free Polymer B and vinyl-free Polymer C, the latter two for comparison purposes.

Polymer A

Methylphenylvinylsiloxane raw rubber consisting of 89.5 mol. % of $(CH_3)_2SiO$ unit, 0.5 mol. % of $(CH_2=CH)(CH_3)SiO$ unit and 10 mol. % of $(C_6H_5)_2SiO$ unit and having a degree of polymerization of 8,000.

Polymer B

Methylvinylsiloxane raw rubber consisting of 99.5 mol. % of $(CH_3)_2SiO$ unit and 0.5 mol. % of $(CH_2=CH)(CH_3)SiO$ unit and having a degree of polymerization of 8,000.

Polymer C

Methylphenylsiloxane raw rubber consisting of 90 mol. % of $(CH_3)_2SiO$ unit and 10 mol. % of $(C_6H_5)_2SiO$ unit and having a degree of polymerization of 8,000.

Silicone rubber compound 1A was prepared by blending in a kneader the following components: (1) 100 parts by weight of Polymer A, (2) 20 parts by weight of silica powder (specific surface area 200 m²/g, Aerogel 200, Nippon Aerogel K. K.), and (3) 3 parts by weight of a dimethylsiloxane oil end-capped with a hydroxyl group and having an average degree of polymerization of 20.

Separately, silicone rubber compound 1B was prepared by blending in a kneader the following components: (1) 100 parts by weight of Polymer (B), (2) 15 parts by weight of silica powder (specific surface area 200 m²/g, Aerogel 200, Nippon Aerogel K. K.), and (3) 5 parts by weight of a dimethylsiloxane oil end-capped with a hydroxyl group and having an average degree of polymerization of 20.

Next, compositions were prepared by blending Polymer A, Polymer B, Polymer C, Compound 1A, and Compound 1B in the amounts shown in Table 1 in a roll mill, and adding dicumyl peroxide in the amount shown in Table 1. The compositions were molded into sheets of 2 mm thick by heat pressing at 170° C. and 100 kg/cm² for 10 minutes. The sheets were measured for physical properties, coefficient of friction and Acron wear. The results are also shown in Table 1.

The coefficient of friction was measured by measuring the coefficient of friction between the silicone rubber and a sheet of plain paper using Type Heidon—14 meter manufactured by Shinto Kagaku K. K. The Acron wear was measured in accordance with "British Standard 903, Part A9 (1957)."

TABLE 1

|  | Example | | | | | Comparative Example | | |
|---|---|---|---|---|---|---|---|---|
|  | 1 | 2 | 3 | 4 | 5 | 1 | 2 | 3 |
| Components (pbw) | | | | | | | | |
| Polymer A | 10 | 20 | — | — | — | — | — | — |
| Polymer B | — | — | — | — | — | 20 | — | — |
| Polymer C | — | — | — | — | — | — | 20 | — |
| Compound 1A | — | — | 30 | 50 | 70 | — | — | — |
| Compound 1B | 90 | 80 | 70 | 50 | 30 | 80 | 80 | 100 |
| Dicumyl peroxide | 0.5 | 0.5 | 0.5 | 0.5 | 0.5 | 0.5 | 0.5 | 0.5 |
| Properties | | | | | | | | |
| Hardness, JIS | 30 | 31 | 32 | 31 | 30 | 31 | 30 | 32 |
| Tensile strength, kgf/cm² | 35 | 30 | 42 | 43 | 45 | 33 | 40 | 40 |
| Elongation, % | 350 | 300 | 410 | 420 | 450 | 370 | 420 | 350 |
| Coefficient of friction | 1.3 | 1.3 | 1.3 | 1.4 | 1.5 | 0.9 | 1.3 | 0.9 |
| Acron wear, cc/1000 cycles | 0.05 | 0.06 | 0.05 | 0.04 | 0.05 | 0.06 | 0.5 | 0.07 |

Next, a paper feed roller comprised of a stainless steel body having a diameter of 10 mm and a surface layer covering the stainless steel body and having a thickness of 5 mm and a length of 25 mm was prepared. The surface layer was formed from a silicone rubber obtained by curing the composition of Example 2, Comparative Example 2 or Comparative Example 3 or the compound 1A (Comparative Example 4) in the same curing conditions as described above.

The coefficients of friction before paper feeding and after paper feeding were measured by the following method. In this case, 10,000 sheets of plain paper were fed by setting the plain papers to a PPC machine.

Measurement of Coefficient of Friction

A sheet of plain paper was press contacted to the roller at a force W of 200 grams and then the roller was driven at a circumferential speed of 500 mm/s to measure the feeding force F (grams). The coefficient of friction was calculated by the equation:

*Coefficient of friction* $= F/W$

The results are shown in Table 2.

TABLE 2

|  | Example | Comparative Example | | |
|---|---|---|---|---|
|  | 2 | 2 | 3 | 4 |
| Coefficient of friction before paper feeding | 2.2 | 2.1 | 1.6 | 2.3 |
| Coefficient of friction after paper feeding | 2.0 | 1.5 | 1.4 | 1.5 |

As is evident from the results of Table 2, the roller having a surface layer formed from the composition of Example 2 had a high coefficient of friction not only before paper feeding but also after paper feeding, and was prevented from abrading. On the other hand, the rollers of Comparative Examples 2 and 4 had a low coefficient of friction after paper feeding by abrading although they had a high coefficient of friction before paper feeding. The roller of Comparative Example 3 had a low coefficient of friction not only before paper feeding but also after paper feeding.

We claim:

1. A paper feed roller comprising a metal or plastic cylindrical body covered on the surface with a high friction rubber obtained by curing a high friction rubber-forming composition comprising in admixture, (a) a silicone rubber compound containing an organopolysiloxane of the average compositional formula (1):

$$R_n^1 SiO_{(4-n)/2} \quad (1)$$

wherein $R^1$ is a substituted or unsubstituted monovalent hydrocarbon group, the groups represented by $R^1$ containing 95 mol. % or less of a methyl group, at least 3 mol. % of a phenyl group and at least 0.2 mol. % of a vinyl group, and n is a positive number of from 1.95 to 2.05, and (B) a silicone rubber compound containing an organopolysiloxane of the average compositional formula (2):

$$R_m^2 SiO_{(4-m))/2} \quad (2)$$

wherein $R^2$ is a substituted or unsubstituted monovalent hydrocarbon group, the groups represented by $R_2$ containing at least 98 mol. % of a methyl group, and m is a positive number of from 1.95 to 2.05, wherein the silicone rubber compounds (A) and (B) are mixed in a weight ratio of 20:80 to 85:20, such that the components form two macroscopically dispersed phases.

2. The paper feed roller of claim 1 wherein the groups represented by $R^1$ contain 5 to 90 mol. % of methyl, 5 to 20 mol. % of phenyl and 0.3 to 1 mol. % of vinyl, and the groups represented by $R^2$ contain at least 98 mol. % of methyl and 0.001 to 2 mol. % of vinyl.

3. The paper feed roller of claim 1 which is for plain paper copiers.

4. The paper feed roller of claim 1 which is for facsimile machines.

5. The paper feed roller of claim 1, wherein the high friction rubber covers the surface of the cylindrical body in a thickness of 1 to 30 mm.

6. The paper feed roller of claim 1, wherein, in the formulae (1) and (2), $R^1$ and $R^2$ are monovalent hydrocarbon groups of 1–12 carbon atoms, optionally substituted by halogen atoms or cyano groups.

7. The paper feed roller of claim 1, wherein the organopolysiloxane of formula (1) has a polymerization degree of 1,000 to 10,000.

8. The paper feed roller of claim 1, wherein the weight ratio of (A) and (B) is 30:70 to 70:30.

9. The paper feed roller of claim 1, wherein the weight ratio of (A) and (B) is 50:50.

* * * * *